United States Patent [19]
Stapley et al.

[11] 3,927,210
[45] Dec. 16, 1975

[54] ANTIBIOTIC ENSANCHOMYCIN

[75] Inventors: Edward O. Stapley, Metuchen, N.J.; Justo Martinez Mata, Madrid, Spain

[73] Assignee: Merck & Co., Inc., Rahway, N.J.

[22] Filed: June 7, 1974

[21] Appl. No.: 477,251

Related U.S. Application Data

[62] Division of Ser. No. 415,185, Nov. 12, 1973.

[52] U.S. Cl. .............................................. 424/118
[51] Int. Cl. .......................................... H61k 21/00
[58] Field of Search .................................... 424/118

[56] References Cited
OTHER PUBLICATIONS
Miller, The Pfizer Handbook of Microbial Metabolites, McGraw–Hill Book Co., Inc., N.Y., N.Y., 1961, pp. 397 and 429.

*Primary Examiner*—Jerome D. Goldberg
*Attorney, Agent, or Firm*—Walter Patton; Julian S. Levitt; Rudolph J. Anderson, Jr.

[57] ABSTRACT

This invention relates to a new phosphorous-containing antibiotic designated MSD 820A, and is hereafter known as Ensanchomycin. The antibiotic is produced by culturing the microorganism *Streptomyces cinnamonensis* or the microorganism *Streptomyces melanogenes*. Ensanchomycin possesses antibacterial activity against both gram-positive and gram-negative bacteria. This invention relates to a new antibiotic substance, to methods for its use, production by fermentation and also to methods for its concentration, purification and isolation.

4 Claims, 1 Drawing Figure

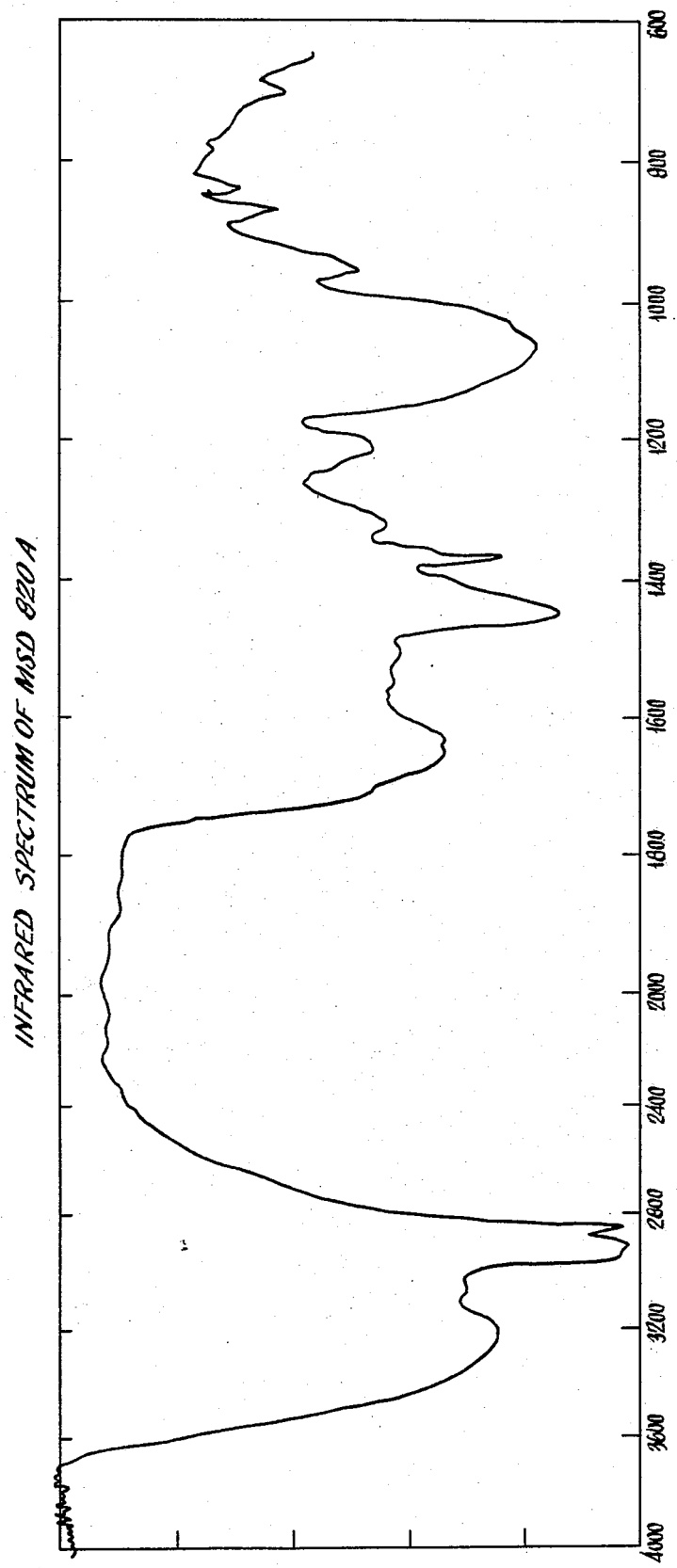

ANTIBIOTIC ENSANCHOMYCIN

This is a division of application Ser. No. 415,185 filed Nov. 12, 1973.

The search for novel antibiotics is a continuing one because the activity of the known antibiotics is usually effective against only a limited number of pathogenic microorganisms. In addition to this limited spectrum of activity, it has been found that certain strains of some pathogens have been able to develop a resistance to particular antibiotics and, as a result, the antibiotics no longer are as effective against these resistant strains.

The main object of this invention is to provide a new and useful antibiotic which is effective in inhibiting the growth of pathogenic bacteria. Another object of this invention is to provide a process for preparing this antibiotic by the fermentation of a nutrient medium with suitable strains of the microorganisms described below.

This new antibiotic is another phosphorus-containing antibiotic related to the growing family of phosphorous-containing antibiotics which includes among others, the previously described compounds: diumycin, umbrinomycin, and moenomycin.

The new antibiotic possesses all of the antimicrobial properties of the known phosphorous-containing antibiotics including activity against gram-positive bacteria such as bacilli, staphylococci, streptococci and diplococci and gram-negative bacteria such as *Escherichia coli, Proteus vulgaris* and *Salmonella schottmuelleri*. The new antibiotic Ensanchomycin has a broad spectrum of activity against gram-negative bacteria and has been found to be active against Pseudomonas.

In addition to its antibiotic activity, Ensanchomycin is an effective growth promoter in animals when administered orally.

The new antibiotic substance of the present invention is formed by growing, under controlled conditions, a previously unknown strain of the microorganism *Streptomyces cinnamonensis*. In addition, the antibiotic may also be prepared by growing a previously unknown strain of the microorganism *Streptomyces melanogenes*. The *Streptomyces cinnamonensis* microorganism was isolated from a sample of soil from the Cata Mountains (Alicante) in Spain. This newly isolated strain of microorganism has been designated as MA-2871 in the culture collection of Merck & Co., Inc., Rahway, N.J. A culture has been deposited without restrictions as to availability with the Fermentation Section of the Northern Utilization Research Branch, U.S. Department of Agriculture at Peoria, Ill., and is added to its permanent culture collection, and is available to the public under culture No. NRRL 5751.

The other microorganism *Streptomyces melanogenes* was isolated from a sample of soil from near Madrid, Spain. This strain of microorganism has been designated as MA-2873 in the culture collection of Merck & Co., Inc., Rahway, N.J. A culture thereof has been deposited without restriction as to availability with the Fermentation Section of the Northern Utilization Research Branch, U.S. Department of Agriculture at Peoria, Ill., and added to its permanent culture collection, and is available to the public under Culture No. NRRL 5752.

The morphological and cultural characteristics of *Streptomyces cinnamonensis* are set forth in the following table.

Morphology - Sporophores are hooks, loops and few loose spirals, occurring as side branches on aerial hyphae. Spores are in chains of more than 10 spores - spherical to oval, $0.9\mu$ diameter and $0.9 \times 1.2\mu$.

Cultural

Tomato paste-oatmeal agar -- Vegetative growth - Dark brown; Aerial mycelium - Moderate, velvety, -- Vegetative rose beige (4ec); Soluble pigment - Brown.

Czapek Dox agar -- Vegetative growth - Brown to dark brown; Aerial mycelium - Moderate, light rose-beige (4ec); Soluble pigment - Light brown.

Glycerol-asparagine agar -- Vegetative growth - Brown to dark brown; Aerial mycelium - Moderate, flesh-pink with beige undertone (4ca); Soluble pigment - Light pinkish brown.

Egg Albumin agar -- Vegetative growth - Brown to dark brown; Aerial mycelium - Scant, brownish; Soluble pigment - Light brown.

Synthetic starch agar -- Vegetative growth - Tan to brown; Aerial mycelium - Moderate, flesh pink with beige undertone (4ca); Soluble pigment - Light pinkish brown.

Yeast extract-dextrose-salts agar -- Vegetative growth - Brown to dark brown; Aerial mycelium - Moderate, light rose beige (4ec); Soluble pigment - Brown.

Calcium malate agar -- Vegetative growth - Cream colored; Aerial mycelium - Moderate, very pale flesh pink; Soluble pigment - None; Utilizes malate.

Nutrient agar -- Vegetative growth - Tan; Aerial mycelium - None; Soluble pigment - Light brown.

Skim milk agar -- Vegetative growth - Dark brown; Aerial mycelium - Moderate, light rose-beige (4ec); Soluble pigment - Brown; Hydrolyzes casein.

Litmus milk -- Vegetative growth - Moderate growth ring; Brown; Aerial mycelium - Scant, whitish; Complete peptonization, becoming alkaline (pH 7.9).

Skim milk -- Vegetative growth - Moderate growth ring, dark brown; Aerial mycelium - Scant, tannish; Soluble pigment - Brown; Peptonization almost complete; Alkaline (pH 8.0).

Nutrient gelatin agar -- Vegetative growth - Light brown; Aerial mycelium - None; Soluble pigment - Brown; Liquefaction good.

Gelatin Stabs -- Vegetative growth - Tan; Aerial mycelium - None; Soluble pigment - Greenish brown; Liquefaction complete.

Nutrient starch agar -- Vegetative growth - Tan; Aerial mycelium - Scant, whitish; Soluble pigment - Light Brown; Starch hydrolysis good.

Nutrient tyrosine agar -- Vegetative growth - Dark brown, almost black; Aerial mycelium - Sparse, tannish; Soluble pigment - Dark brown; Decomposes tyrosine crystals.

Pepton-iron-yeast extract agar -- Vegetative growth - Dark brownish gray to black; Aerial mycelium - None; Soluble pigment - Dark brown to black; Melanin positive; $H_2S$ production positive.

Temperature range (Yeast extract-dextrose-salts agar) -- 50°C. - No growth; 37°C. - Moderate growth; 28°C. - Good growth.

Potato plugs -- Vegatative growth - Dark brownish gray; Aerial mycelium - None; Soluble pigment - Dark brown; Liquefaction good.

Loeffler's Blood Serum Agar -- Vegetative growth - Dark gray; Aerial mycelium - None; Soluble pigment - Dark brown; Liquefaction good.

Aerobic.

Nitrate reduction - positive.

Carbohydrate utilization (Pridham-Gottlieb basal medium + 1% carbohydrate) -- Glucose, arabinose, fructose, inositol, lactose, maltose, mannitol, raffinose, rhamnose, sucrose and xylose are utilized for growth. Cellulose is not utilized.

All readings were taken after three weeks incubation at 28°C.

The pH of all media is approximately neutral (6.8–7.2).

Color designations are from Color Harmony Manual, 4th Edition, 1958, Container Corporation of America, Chicago, Ill.

The morphological and cultural characteristics of *Streptomyces melanogenes* are set forth in the following table.

Morphology - Sporophores branched, flexuous, some with hooks and loops. Spores are in chains of more than 10 spores, cylindrical, $0.9\mu \times 1.2\mu$.

Cultural

Tomato paste-oatmeal agar -- Vegetative growth - Reverse brown; Aerial mycelium - Cream colored, velvety; Soluble pigment - Tan.

Czapek Dox agar -- Vegetative growth - Yellowish; Aerial mycelium - Scant, whitish; Soluble pigment - Tannish.

Glycerol-asparagine agar -- Vegetative growth - Reverse reddish brown; Aerial mycelium - Velvety, pale rose beige (4ec); Soluble pigment - Dark reddish brown.

Egg albumin agar -- Vegetative growth - Reverse dark brown; Aerial mycelium - Velvety, pale rose-beige (4ec); Soluble pigment - Dark brown.

Synthetic starch agar -- Vegetative growth - Reverse colorless to tan; Aerial mycelium - Cottony white; Soluble pigment - None; Hydrolysis of starch - Moderate.

Nutrient starch agar -- Vegetative growth - Tan; Aerial mycelium - Moderate, brownish white; Soluble pigment - Light brown along growth streak; Hydrolysis of starch - Moderate.

Nutrient gelatin agar -- Vegetative growth - Tan; Aerial mycelium - Brownish white; soluble pigment - Brown; Liquefaction of gelatin - Good.

Gelatin stabs -- Vegetative growth - Greenish tan growth ring; Aerial mycelium - None; Soluble pigment - Dark greenish brown; Liquefaction of gelatin - Complete.

Skim milk agar plates -- Vegetative growth - Brown to grayish-brown; Aerial mycelium - None; Soluble pigment - Dark brown; Some hydrolysis of casein.

Litmus milk -- Vegetative growth - Heavy dark brown growth ring; Aerial mycelium - Sparse, grayish; Soluble pigment - Dark brown; Partial peptonization - pH remaining about the same as pH of control tube.

Skim milk -- Vegetative growth - Moderate, brown to tan growth ring; Aerial mycelium - Sparse, brownish; Soluble pigment - Dark brown; Partial peptonization - pH about the same as that of control tube.

Nutrient tyrosine agar -- Vegetative growth - Dark brown, almost black; Aerial mycelium - Gray in center, grayish-cream along edges; Soluble pigment - Brown; Decomposes tyrosine crystals.

Loeffler Blood Serum Slants -- Vegetative growth - Dark gray; Aerial mycelium - None; Soluble pigment - Black beneath cultures shading to gray; Liquefaction - Moderate.

Potato plugs -- Vegetative growth - Dark brown; Aerial mycelium - Cottony, cream to grayish-cream; Soluble pigment - Moderate darkening of plug.

Nutrient agar -- Vegetative growth - Tan, spreading; Aerial mycelium - Scant, whitish; Soluble pigment - Light brown.

Peptone-yeast extract - iron agar -- Vegetative growth - Dark gray to black; Aerial mycelium - None; Soluble pigment - Dark brown to almost black; Melanin - Positive; $H_2S$ production positive.

Temperature range (Yeast extract-dextrose-salts agar) -- 50°C. - No growth; 37°C. - Moderate growth; 28°C. - Good growth.

Aerobic.

Nitrate reduction - positive.

Carbohydrate utilization (Pridham-Gottlieb basal medium + 1% carbohydrate) -- Glucose, arabinose, fructose, inositol, lactose, maltose, mannose, mannitol, sucrose, xylose, raffinose and rhamnose are utilized for growth. Cellulose is not utilized.

Color designations from Color Harmony Manual, 4th Edition, 1958, Container Corporation of America, Chicago, Ill.

All readings were taken after three weeks incubation at 28°C. except where noted. The pH of all media is approximately neutral (6.8–7.2).

The above description of the microorganisms producing Esanchomycin is given as illustrative of the strains of *Streptomyces cinnamonensis* (MA-2871) and *Streptomyces melanogenes* (MA-2873) which can be employed in the production of Ensanchomycin. However, the present invention also embraces mutant species of the above described microorganisms. For example, those mutants which are obtained by natural selection or those produced by mutating agents including X-ray irradiation, ultraviolet irradiation or nitrogen mustards or like treatments.

PHYSICAL CHARACTERISTICS

Ensanchomycin reacts like an acidic organic compound and is soluble in alkaline solutions such as aqueous solutions of the alkali metal hydroxides, carbonates or bicarbonates which forms the corresponding salts. Also, Ensanchomycin reacts with other bases such as ammonia and the like.

Ensanchomycin as its ammonium salt has been degraded by strong acid hydrolysis (4N hydrochloric acid at 105°C. for six hours) to yield the following degradation products: ammonia, and glucosamine. However, there was no 6-deoxyglucosamine.

A solution of Ensanchomycin in 0.1N hydrochloric acid exhibits an ultraviolet absorption with a peak at λ max. 247 nm ($E_{1\ cm.}^{1\%}$ 63.3).

A solution of Ensanchomycin in 0.1N sodium hydroxide exhibits an ultraviolet absorption with a peak at λ max. 258 nm ($E_{1\ cm.}^{1\%}$ 104).

The infrared absorption spectrum of Ensanchomycin ammonium salt in a mineral oil (Nujol) is reproduced in FIG. 1 in the drawing.

Ensanchomycin contains the elements carbon, hydrogen, nitrogen, phosphorous and oxygen. The following is an elemental analysis of Ensanchomycin ammonium salt:

| | |
|---|---|
| Carbon | 47.11 percent |
| Hydrogen | 6.90 percent |
| Nitrogen | 7.67 percent |
| Phosphorous | 1.93 percent |
| Oxygen (by difference) | 36.39 percent |

According to the micro-analytical data, Ensanchomycin ammonium salt has the approximate empirical formula: $C_{63}H_{110}N_9O_{36}P$ with a calculated molecular weight of 1600.6. Titration of an aqueous solution of Ensanchomycin ammonium salt indicates an equivalent weight of 1477, and a $pK_a$ 4.6. The material employed to determine the above physical characteristics was obtained from Example 4 below.

IN VITRO ACTIVITY

A sample of Ensanchomycin was assayed in a series of agar diffusion assays. A broad spectrum of activity was obtained and is summarized in Table 1.

Methods

The assays are performed by placing paper discs of one-fourth inch diameter (7 mm.), previously immersed into a distilled water solution of Ensanchomycin, on the surface of 100 mm. petri plates containing 5 ml. of inoculated nutrient agar with 0.2 percent yeast extract. With the exception of *Bacillus subtilis* which is used as a spore suspension, the agar is seeded with an overnight culture grown under appropriate conditions (see Table 1) and diluted with nutrient broth to O.D. = 0.22 at 660 nm. The diluted overnight inoculum is added to agar at 3.3 or 6.6 percent (v/v), depending on the organism. Plates are incubated overnight at temperatures indicated in Table 1.

lated from the survival records obtained on the seventh day after infection by the Method of Knudson & Curtis (J. Amer. Statist. Assoc. 42:282-296, 1947).

TABLE 2

| Infecting Organism | Route of Therapy | $ED_{50}$ mg./dose |
|---|---|---|
| *Diplococcus pneumoniac* I-37 | ip | 0.250 |
|  | sc | 1.21 |
| *Staphylococcus aureus* 2949 | ip | 0.151 |
|  | sc | 4.0 |
|  | po | >25.0 |
| *Streptococcus pyogenes* 3009 | ip | 0.004 |
|  | sc | 0.027 |
|  | po | 42.7 |
| *Klebsiella pneumoniae* 3068 | ip | >5.0* |
| *Proteus mirabilis* 3201 | ip | >10.0* |
| *Proteus morganii* 3202 | ip | 6.7 |
| *Proteus vulgaris* 1810 | ip | 5.33 |
| *Pseudomonas aeruginosa* 2616 | ip | 3.37 |
| *Pseudomonas aeruginosa* 3210 | ip | 3.34 |
| *Salmonella Schottmuelleri* 3010 | ip | 4.3 |
|  | sc | >10.0 | ip = intraperitoneal
sc = subcutaneous
po = oral
*Significant prolongation of survival time (p = 0.01 for *Klebsiella* and 0.005 for *P. mirabilis*, where p = significance level).

Ensanchomycin is useful both as an antibiotic and as a growth promoting agent in animals.

Ensanchomycin can be used as an antibiotic, for example, in the form of pharmaceutical preparations which contain it in admixture or conjunction with an organic or inorganic, solid or liquid pharmaceutical excipient suitable for enteral, parenteral or local administration. Suitable excipients are substances that do not react with the antibiotic, for example, water, gelatin, lactose, starches, stearyl alcohol, magnesium stea-

TABLE 1

| Organism | Culture Source*** | Inoculum Development | Zones of Inhibition, mm. | | |
|---|---|---|---|---|---|
| | | | 500 γ/ml. | 250 γ/ml. | 125 γ/ml. |
| *Pseudomonas aeruginosa* | MB 979 | NBYE*, 37°C., a | 10 | 7 | 7 |
| *Staphylococcus aureus* | ATCC 6538P | NBYE, 37°C., a | 32 | 31 | 29 |
| *Bacillus subtilis* | ATCC 6633 | b. 37°C., a | 32 | 28 | 27 |
| *Staphylococcus aureus* | MB 698** | NBYE, 37°C., a | 22 | 20 | 18 |
| *Alcaligenes faecalis* | ATCC 213** | NBYE, 37°C., a | 16 | 14 | 12 |
| *Vibrio percolaus* | ATCC 8461 | NBYE, 28°C., c, d | 19 | 16 | 13 |
| *Xanthomonas vasicatoria* | MB 815 | AM₃*, 37°C., a, d | 10 | 7 | 7 |
| *Proteus vulgaris* | ATCC 21100 | AM₃, 37°C., a, d | 30 | 30 | 30 |
| *Escherichia coli* | MB 1418 | AM₃, 37°C., a, d | 14 | 12 | 10 |
| *Klebsiella pneumoniae* | MB 1264 | AM₃, 37°C., a, d | 10 | 8 | 7 |
| *Aerobacter aerogenes* | MB 835 | AM₃, 37°C., a, d | 9 | 7 | 7 |
| *Staphylococcus aureus* | MB 3003 | NBYE, 37°C., a | 23 | 21 | 18 |
| *Proteus vulgaris* | MB 2146 | NBYE, 37°C., a | 24 | 21 | 19 |
| *Streptococcus agalactiae* | MB 2875** | BH*, 37°C., c | 30 | 29 | 27 |
| *Streptococcus faecalis* | MB 753 | BH, 37°C., c | 18 | 14 | 11 | a 3.3 percent (v/v) of diluted inoculum was added to the agar for plates.
b Inoculum consists of 1 ml. of a refrigerated spore suspension diluted to 10 ml. with saline.
c 6.6 percent (v/v) of diluted inoculum was added to the agar for plates.
d Inoculum is grown on the shaker at 220 rpm. The remainder of the cultures are incubated stationary.
*NBYE, AM₃ and BH refer to media for development of inocula.
NBYE = nutrient broth + 0.2 percent yeast extract;
AM₃ = antibiotic medium No. 3 (Difco);
BH = brain heart infusion broth.
**Plates are incubated at 37°C.; plates for the remainder of cultures are incubated at 25°C.
***MB = Culture collection of Merck & Co., Inc., Rahway, N. J.

IN VIVO ACTIVITY

Method

White Swiss mice were infected intraperitoneally and treated by the route indicated in Table 2 at the time of infection and again six hours later. Five mice were used at each of the 4-fold antibiotic concentrations tested. The amount of antibiotic that should protect 50 percent of the infected treated animals ($ED_{50}$) is calcurate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or contain assistants, such as preserving, stabilizing, wetting or emulsifying agents;

solution promoters, salts for regulating the osmotic pressure or buffers.

Where it is desired to administer the antibiotic in dry, solid unit dosage form, capsules, boluses or tablets containing the desired amount of antibiotic are employed. These dosage forms are prepared by intimately and uniformly mixing the active ingredient with suitable finely divided diluents, fillers, disintegrating agents and/or binders such as starch, lactose, talc, magnesium stearate, vegetable gums and the like.

Such unit dosage formulations may be varied widely with respect to their total weight and content of Ensanchomycin depending upon factors such as the type of host animal to be treated, the severity and type of infection and the weight of the host. The antibiotic may be administered on a daily basis at from about 20 to 200 mg. per kilograms of body weight.

Included in this invention are the non-toxic, pharmaceutically acceptable salts of Ensanchomycin, for example, the alkali and alkaline earth metal salts such as those derived from sodium, potassium, ammonium and calcium or salts with organic bases, for example, triethylamine, N-ethylpiperidine, dibenzylethylenediamine.

In addition to its use as an antibiotic, Ensanchomycin is useful as a feed additive to promote the growth of animals such as chickens, sheep and cattle. The use of Ensanchomycin shortens the time required for bringing animals up to marketable weight.

When Ensanchomycin is used as a growth promoter in animals, it can be administered as a component of the feed of the animals or may be dissolved or suspended in the drinking water.

When Ensanchomycin is used as a component of the animal feed, it is first formulated as a feed supplement. In such feed supplements, Ensanchomycin is present in relatively large amounts intimately dispersed in an inert carrier or diluent. The feed supplement can be added directly to the feed or made into a premix by an intermediate dilution or blending step. By inert carrier is meant one that will not react with the antibiotic and one that may be administered safely to animals. Preferably, the carrier is one that is, or may be, an ingredient of the animal ration. Typical carriers or diluents suitable for such compositions include, for example, distillers' dried grains, corn meal, citrus meal, fermentation residues, ground oyster shells, wheat shorts, molasses solubles, corn cob meal, edible bean mill feed, soya grits, crushed limestone and the like. The antibiotic is intimately dispersed throughout the carrier by methods such as grinding, stirring, milling or tumbling. Compositions containing from about 5 to 50% by weight of the antibiotic are particularly suitable as feed supplements.

Examples of typical feed supplements containing Ensanchomycin dispersed in a solid carrier are:

|  | lbs. |
|---|---|
| (A) Ensanchomycin | 5 |
| Wheat Standard Middling | 95 |
| (B) Ensanchomycin | 50 |
| Corn distiller's grains | 50 |

These and similar feed supplements are prepared by uniformly mixing the antibiotic with the carrier.

Such supplements are added to the animal feed in an amount to give the finished feed the concentration of Ensanchomycin desired for growth promotion. In chickens, Ensanchomycin is fed at a final concentration of between 50 gm. to 200 gm. per ton of feed in order to achieve the desired growth promoting result.

In the above discussion of this invention, emphasis has been placed on solid compositions wherein the Ensanchomycin is mixed with an edible carrier in a feed supplement, in a so-called premix or in the final poultry feedstuff. This is the preferred method of administering Ensanchomycin. An alternate method is to dissolve or suspend the Ensanchomycin in the drinking water of the animals. The quantity that may be suspended in the water without undue settling is limited. Emulsifiers or surface active agents may be employed for this latter purpose.

It will likewise be understood by those skilled in this art that special feed supplement formulations and finished animal feeds containing Ensanchomycin may also include vitamins, other antibiotics and growth-promoting agents and other nutritional substances.

Ensanchomycin is produced during the aerobic fermentation of suitable aqueous media, under conditions described hereinafter, by strains of *Streptomyces cinnamonensis* and *Streptomyces melanogenes*. Aqueous media such as those used for the production of other antibiotics are suitable for the production of Ensanchomycin.

Such media contain sources of carbon and nitrogen assimilable by the microorganisms and inorganic salts. In addition, the fermentation media contain traces of metals necessary for the growth of the microorganisms which are usually present in complex sources of carbon and nitrogen of the medium.

In general, carbohydrates such as sugars, for example, dextrose, sucrose, maltose, lactose, dextran and the like, and starches, are suitable sources of assimilable carbon in the nutrient media. The exact quantity of the carbon source which is utilized in the medium will depend, in part, upon the other ingredients of the medium but it is usually found that the amount of carbohydrate between about 1 and 6 percent by weight of the medium is satisfactory. These carbon sources can be used individually or several such carbon sources may be combined in the medium.

Various nitrogen sources such as yeast hydrolysates, yeast autolysates, soybean meal, casein hydrolysates, corn steep liquors, distiller's solubles, meat extract and the like, are readily assimilable by the new strains of *Streptomyces cinnamonensis* and *Streptomyces melanogenes* in the production of Ensanchomycin. The various sources of nitrogen can be used alone or in combination in amounts ranging from about 0.2 to about 6 percent by weight of the medium.

The following are examples of media suitable for growing the several strains of *Streptomyces cinnamonensis* and *Streptomyces melanogenes* for producing Ensanchomycin.

| Medium No. 1 (Agar Slant Culture) | |
|---|---|
| Yeast extract | 10.0 g. |
| Glucose | 10.0 g. |
| +Phosphate buffer | 2.0 ml. |
| $MgSO_4 \cdot 7H_2O$ | 0.05 g. |
| Agar | 20.0 g. |
| Distilled $H_2O$ | 1000.0 ml. |
| +Phosphate Buffer | |
| $KH_2PO_4$ | 91.0 g. |
| $Na_2HPO_4$ | 95.0 g. |
| Distilled $H_2O$ | 1000.0 ml. |

-continued
Medium No. 2
(For Inoculum Development)

| | |
|---|---|
| Beef extract | 3.0 g. |
| Casein hydrolysate | |
| (NZ amine) Type E (Sheffield Chem. Corp) | 10.0 g. |
| Dextrose | 10.0 g. |
| Sodium Chloride | 5.0 g. |
| Distilled H$_2$O | 1000.0 ml. |
| pH 7.2 | |

Medium No. 3
(Fermentation)

| | |
|---|---|
| Distiller's solubles | 20.0 g. |
| Dextrose | 10.0 g. |
| Distilled H$_2$O | 1000.0 ml. |
| pH 7.0 | |

Medium No. 4

| | |
|---|---|
| *Autolysed yeast | 10.0 g. |
| Distiller's solubles | 20.0 g. |
| Dextrose | 10.0 g. |
| Distilled H$_2$O | 1000.0 ml. |
| pH 7.0 | |

*Amber yeast - BYF 300 - Amber Laboratories

The fermentation employing the Ensanchomycin producing microorganisms can be conducted at temperatures ranging from about 20° to about 37°C. For optimum results, we find it most convenient to conduct these fermentations at a temperature in the range of from about 24° to about 32°C. The pH of the nutrient medium suitable for producing Ensanchomycin can vary from about 5.0 to 9.0 with a preferred range of 6.0 to 7.5.

Small scale fermentations are conveniently carried out by placing suitable quantities of nutrient medium in a flask employing known sterile techniques, inoculating the flask with either spores or vegetative cellular growth of an Ensanchomycin producing strain of *Streptomyces cinnamonensis* or *Streptomyces melanogenes*, loosely stoppering the necks of the flasks with cotton and permitting the fermentation to proceed in a constant temperature room at about 28°C. on a shaker for about 3 to 10 days. For larger scale work, it is preferable to conduct the fermentation in suitable tanks provided with an agitator and a means of aerating the fermentation medium. The nutrient medium is made up in the tank and after sterilization is inoculated with a suitable source of vegetative cellular growth of an Ensanchomycin producing strain of *Streptomyces cinnamonensis* or *Streptomyces melanogenes*. The fermentation is allowed to continue for from 1 to 5 days while agitating and/or aerating the nutrient medium at a temperature in the range of from about 24° to 32°C.

The examples which follow are illustrative of the fermentation processes useful in the production of Ensanchomycin.

EXAMPLE 1

A culture of *Streptomyces cinnamonensis* strain MA-2871 is produced by growing the organism on a sterile nutrient agar slant of the following composition:

Medium No. 1
(Agar Slant Culture)

| | |
|---|---|
| Yeast extract | 10.0 g. |
| Glucose | 10.0 g. |
| +Phosphate buffer | 2.0 ml. |
| MgSO$_4$.7H$_2$O | 0.05 g. |
| Agar | 20.0 g. |
| Distilled H$_2$O | 1000.0 ml. |

-continued
Medium No. 1
(Agar Slant Culture)

| | |
|---|---|
| +Phosphate Buffer | |
| KH$_2$PO$_4$ | 91.0 g. |
| Na$_2$HPO$_4$ | 95.0 g. |
| Distilled H$_2$O | 1000.0 ml. |

The slant is inoculated with spores and is incubated for one week at 28°C. The culture obtained is used to inoculate a 250 ml. baffled Erlenmeyer flask containing 50 ml. of a sterile growth medium having the following composition:

Medium No. 2
(For Inoculum Development)

| | |
|---|---|
| Beef extract | 3.0 g. |
| Casein hydrolysate | |
| (NZ amine) Type E (Sheffield Chem. Corp) | 10.0 g. |
| Dextrose | 10.0 g. |
| Sodium Chloride | 5.0 g. |
| Distilled H$_2$O | 1000.0 ml. |
| pH 7.2 | |

The seed flask is incubated on a 220 rpm. shaker (two inch throw) for 3 days at 28°C. The contents of this seed flask is used to inoculate second stage seed flasks of the same composition as above. These were also incubated on a 220 rpm. shaker (two inch throw) for 3 days at 28°C.

At the end of the 3 days incubation, the contents of the second stage flasks were pooled asceptically and used to inoculate (at 2.5 percent) 2-liter baffled Erlenmeyer flasks containing 350 ml. of sterile medium of the following composition:

Medium No. 3
(Fermentation)

| | |
|---|---|
| Distiller's solubles | 20.0 g. |
| Dextrose | 10.0 g. |
| Distilled H$_2$O | 1000.0 ml. |
| pH 7.0 | |

The flasks are shaken on a 135-140 rpm. shaker (two inch throw) for 6 days. The contents of the flasks are pooled and a sample centrifuged. Filter paper discs one-half inch in diameter are soaked in the solution to be assayed and set on the agar surface. The plates are incubated at 37°C. for 18 hours. An inhibition zone of 23.5 mm. is observed against *Proteus vulgaris* (ATCC 21100) and 18 mm. against *Vibrio percolans* (ATCC 8461).

EXAMPLE 2

A culture of *Streptomyces melanogenes* strain MA-2873 is produced by growing the organism on a sterile agar slant of the following composition:

Medium No. 1
(Agar Slant Culture)

| | |
|---|---|
| Yeast extract | 10.0 g. |
| Glucose | 10.0 g. |
| +Phosphate buffer | 2.0 ml. |
| MgSO$_4$.7H$_2$O | 0.05 g. |
| Agar | 20.0 g. |
| Distilled H$_2$O | 1000.0 ml. |
| +Phosphate Buffer | |
| KH$_2$PO$_4$ | 91.0 g. |
| Na$_2$HPO$_4$ | 95.0 g. |

-continued
Medium No. 1
(Agar Slant Culture)

| | |
|---|---|
| Distilled H$_2$O | 1000.0 ml. |

The slant is inoculated with spores and incubated for one week at 28°C. They are then stored at 4°C. until used. The culture obtained is used to inoculate a 250 ml. baffled Erlenmeyer flask containing 50 ml. of medium of the following composition:

Medium No. 1 (without agar)

| | |
|---|---|
| Yeast extract | 10.0 g. |
| Glucose | 10.0 g. |
| +Phosphate buffer | 2.0 ml. |
| MgSO$_4$.7H$_2$O | 0.05 g. |
| Distilled H$_2$O | 1000.0 ml. |
| +Phosphate Buffer | |
| KH$_2$PO$_4$ | 91.0 g. |
| Na$_2$HPO$_4$ | 95.0 g. |
| Distilled H$_2$O | 1000.0 ml. | which is incubated on a 220 rpm. shaker (two inch throw) at 28°C. for 3 days.

The contents of this seed flask is used to inoculate (at 2.5 percent) 2-liter baffled Erlenmeyer flasks, each containing 350 ml. of medium of the following composition:

Medium No. 4

| | |
|---|---|
| *Autolysed yeast | 10.0 g. |
| Distiller's solubles | 20.0 g. |
| Dextrose | 10.0 g. |
| Distilled H$_2$O | 1000.0 ml. | pH 7.0
*Amber yeast - BYF 300 - Amber Laboratories

These flasks are incubated on a 135–140 rpm. shaker (two inch throw) for 5 days. The contents of the flasks are pooled and a sample centrifuged. An assay, as described in Example 1, of this material gives an inhibition zone of 15 mm. against Proteus vulgaris (ATCC 21100) and 15 mm. against *Vibrio percolans* (ATCC 8461).

EXAMPLE 3

Fermentation Process for Large Scale Preparation of Ensanchomycin

Stage 1

The contents of one lyophilized tube of *Streptomyces cinnamonensis* (MA-2871) are put into suspension in 2 ml. of Medium A. This suspension is used to inoculate agar slants of Medium A solidified with 2 percent agar. Slant cultures were incubated at 28°C. for 5 days or until well sporulated. These cultures are used within two weeks of preparation, and stored at 5°C. until use.

Medium A

| | |
|---|---|
| Yeast Extract | 10.0 g. |
| Dextrose | 10.0 g. |
| MgSO$_4$.7H$_2$O | 0.05 g. |
| +Phosphate Buffer | 2.0 ml. |
| Distilled Water | 1000.0 ml. |
| pH 6.6 before sterilization | |
| +Phosphate Buffer | |
| KH$_2$PO$_4$ | 91.0 g. |
| Na$_2$HPO$_4$ | 95.0 g. |
| Distilled Water | 1000.0 ml. |
| pH 7.0 | |

Stage 2

Ten ml. of Medium B is added to slant culture from Stage 1 and the growth is scraped into suspension and used to inoculate 50 ml. of Medium B contained in a 250 ml. baffled Erlenmeyer flask. The flask culture is incubated on a rotary shaker at 28°C. for 48 hours. Freshly developed Stage 2 culture is used immediately to proceed to the next stage.

Medium B

| | |
|---|---|
| Dextrose | 1.0% |
| NaCl | 0.5% |
| NZ Amine Type E (Sheffield Chem. Corp.) | 1.0% |
| Meat Extract | 0.3% |
| Distilled H$_2$O to Volume | |
| pH 7.0 to 7.2 | |

Stage 3

Ten ml. of vegetative growth from the Stage 2 flask is used to inoculate 500 ml. of Medium B contained in a 2-liter baffled Erlenmeyer flask. The flask is incubated for 48 hours at 28°C. on a rotary shaker and then used immediately to proceed to Stage 4.

Stage 4

The contents of a Stage 3 flask (500 ml.) are used to inoculate 467 liters of Medium B contained in a 200 gallon stainless steel fermentor. Incubation in the fermentor is allowed to proceed for 65 hours at a temperature of 28°C. with agitation at 130 rpm. and an air flow of 10 cu. ft. per minute. During incubation, defoamer (Polyglycol No. 2000) is used as required to control foam, but not in excess of 0.1 percent. During the procedure of this fermentation, physiology determinations were made as follows:

| Age in Hours | pH | Sugar (Dextrose) (mg./ml.) |
|---|---|---|
| 0 | 6.4 | 9.5 |
| 12 | 6.4 | 9.5 |
| 24 | 6.3 | 9.0 |
| 36 | 5.5 | 4.7 |
| 48 | 7.4 | 0.3 |
| 60 | 7.9 | 0.3 |
| 65 | 8.4 | 0.3 |

Stage 5

The contents of the fermentor from Stage 4 (467 liters) are used to inoculate 4,082 liters of Medium C contained in a 1500 gallon stainless steel fermentor. Fermentation was allowed to proceed for 144 hours at a temperature of 28°C. with agitation at 120 rpm. and air flow of 55.3 cu. ft. per minute. During the fermentation, defoamer (Polyglycol No. 2000) was added as required to control foam but not in excess of 0.1 percent.

Medium C

| | |
|---|---|
| Distiller's Solubles | 2.0% |
| Dextrose | 1.0% |
| Water to Volume | |
| pH 7.0 | |

Determinations were made periodically of pH, dextrose concentration and antibiotic activity as follows:

| Age in Hours | pH | Dextrose (mg./ml.) | Assay* Staphylococcus aureus MB-108 | Assay** Proteus vulgaris ATCC 21100 |
| --- | --- | --- | --- | --- |
| 0 | 7.0 | 9.5 | | |
| 12 | 5.8 | 7.0 | | |
| 24 | 5.2 | 1.2 | | |
| 36 | 6.6 | 0.6 | | |
| 48 | 7.1 | 0.3 | | |
| 60 | 7.6 | 0.2 | | |
| 72 | 7.8 | 0 | | |
| 84 | 8.0 | — | 29 | 16 |
| 96 | 8.1 | — | 24 | 17.5 |
| 108 | 8.4 | — | 24.5 | 17 |
| 120 | 8.4 | — | 25 | 20 |
| 132 | 8.4 | — | 21 | 19.5 |
| 144 | 8.5 | — | 22.3 | 19 |

*Assay performed by agar disc diffusion procedure (results in mm. of diameter of inhibition zone), using ½ inch discs.
**Assay procedure as described at page 10.

The Ensanchomycin was isolated and purified as described in Example 4.

EXAMPLE 4

Isolation and Purification of Ensanchomycin

The filtrate from the 4082-liter batch of Example 3 above and the filtrates from two 400-liter fermentation batches prepared simultaneously with the above mentioned 4082-liter batch were combined to afford 5000 liters of filtrate. The filtrate had a total dissolved solids content of 28 mg. per ml. This was determined by evaporating, at 105°C., a 1 ml. volume of the filtrate in a preweighed aluminum boat and weighing the residue. The pH of the filtrate was 8. If the pH was not 8, it was adjusted with either dilute hydrochloric acid or dilute sodium hydroxide solution to pH 8 in order to obtain best results with chromatography on Dowex resin.

The filtrate at a pH of 8 is adsorbed on Dowex 1 × 2 Cl⁻ (100 liters) resin at 10 liters per minute. The effluent stream is sampled every 500 liters and assayed against *Proteus vulgaris* (ATCC 21100). There is no measurable breakthrough of antibiotic activity during the adsorption. The adsorbate is washed with water and then eluted with 500 liters of 70 percent methanol; 3 percent ammonium bicarbonate. Twenty-five fractions were collected of approximately 19 liters each. Each fraction was assayed against *Proteus vulgaris* (ATCC 21100). Fractions 6 to 25 which contain 60 percent of the filtered broth activity, are combined and concentrated in vacuum at 30°C. to 110 liters. The concentrate contained 3.06 kg. of total solids with approximately a 30-fold increase in potency. (A 120 mg. per ml. solution showed a 25 mm. zone of inhibition against *Proteus vulgaris* before chromatography and a 4 mg. per ml. solution showed the same inhibition after chromatography).

The eluate concentrate from above is adjusted to a pH of 7.0 with dilute hydrochloric acid and adsorbed on Amberlite XAD-2 (140 liters) at approximately 3 liters per minute. The adsorbate was washed with 230 liters of water and then eluted with a step-wise gradient as follows: (1) 230 liters of 25 percent methanol; (2) 230 liters of 50 percent methanol; (3) 230 liters of 75 percent methanol; and (4) 300 liters of 100 percent methanol. The 25 percent methanol eluate is collected as one fraction; all other eluate streams are collected in 19-liter fractions. The overall recovery of charged bioactivity is 91 percent. The recovery breakdown is as follows: (1) spent stream - 0; (2) waterwash - 0; (3) 25 percent methanol - 4.6 percent; (4) 50 percent methanol - 29.0 percent; (5) 75 percent methanol - 39.8 percent; and (6) 100 percent methanol - 17.4 percent. The fractions containing the highest potency material is the 75 percent methanol fractions having an average of 16-fold increase in potency over the Dowex 1 × 2 eluate concentrate. Selected eluate fractions are combined and concentrated to 1.5 liters at a pH of 7.0. The concentrate is filtered and freeze-dried to yield 79.5 g. with an average potency of 250 μg. per ml., equal to a 25 mm. zone against *Proteus vulgaris* (ATCC 21100).

Brinkman silica-gel (40 g.) is slurried in 100 to 20 n-propanol/ammonia (2N) and placed in a column. Five hundred mg. of the product obtained above is dissolved in 100 to 20 n-propanol/ammonia (2N) (5 ml.), and water (2 ml.) and applied to the column. The column is developed with 200 ml. of a 100 to 20 propanol/2N ammonia; 200 ml. of an 80 to 20 solution; and 300 ml. of an 80 to 30 solution at a rate of 1 ml. per minute. A forerun (375 ml.) is collected and then 1.5 ml. fractions. A single bioactivity peak is observed between fractions 50 and 110 when assayed against *Proteus vulgaris* (ATCC 21100). Fractions 55 to 93 are combined and concentrated to 3 ml. and freeze-dried. The residue obtained is 115.7 mg. of the ammonium salt with a potency of 125 μg. per ml. equal to a 25 mm. zone against *Proteus vulgaris* (ATCC 21100). This represents a 46 percent recovery with a two-fold purification. This sample is analyzed to afford the results reported above under the heading Physical Characteristics.

The following is a diagram of the method described in Example 4:

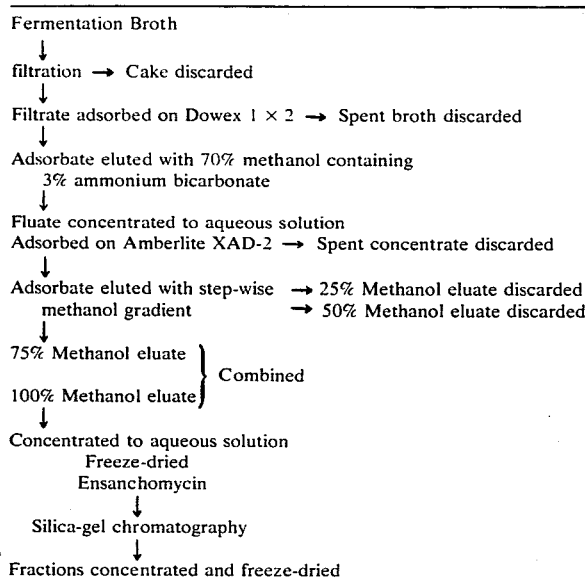

FLOW SHEET - ANTIBIOTIC PROCESS

Fermentation Broth
↓
filtration → Cake discarded
↓
Filtrate adsorbed on Dowex 1 × 2 → Spent broth discarded
↓
Adsorbate eluted with 70% methanol containing
3% ammonium bicarbonate
↓
Fluate concentrated to aqueous solution
Adsorbed on Amberlite XAD-2 → Spent concentrate discarded
↓
Adsorbate eluted with step-wise → 25% Methanol eluate discarded
methanol gradient  → 50% Methanol eluate discarded
↓
75% Methanol eluate ⎫
                    ⎬ Combined
100% Methanol eluate ⎭
↓
Concentrated to aqueous solution
   Freeze-dried
   Ensanchomycin
↓
Silica-gel chromatography
↓
Fractions concentrated and freeze-dried

EXAMPLE 5

Fermentation Process for the Production of Ensanchomycin

Stage 1

The contents of one lyophilized tube of *Streptomyces melanogenes* culture (MA-2873) were transferred, using aseptic techniques, into 2 to 3 ml. of Medium A. This suspension was used to inoculate agar slants of Medium A solidified with 2 percent agar. Slant cultures were incubated at 28°C. for 5 days or until well sporulated. These cultures were then stored at 5°C. and used within two weeks of preparation.

| Medium A | |
|---|---|
| Yeast Extract | 10.0 g. |
| Dextrose | 10.0 g. |
| MgSO$_4$.7H$_2$O | 0.05 g. |
| +Phosphate Buffer | 2.0 ml. |
| Distilled Water | 1000.0 ml. |
| pH 6.6 before sterilization | |
| | |
| +Phosphate Buffer | |
| KH$_2$PO$_4$ | 91.0 g. |
| Na$_2$HPO$_4$ | 95.0 g. |
| Distilled Water | 1000.0 ml. |
| pH 7.0 | |

Stage 2

Ten ml. of Medium B was added to a slant from Stage 1, the growth was scraped into a suspension, and this was used to inoculate a seed flask containing 500 ml. Medium B in a 2-liter baffled Erlenmeyer flask using aseptic techniques. This flask was shaken at 28°C. on a rotary shaker for 48 hours and then used immediately to proceed to Stage 3.

| Medium B | |
|---|---|
| Dextrose | 1.0% |
| NaCl | 0.5% |
| NZ Amine Type E (Sheffield Chem. Corp.) | 1.0% |
| Meat Extract | 0.3% |
| Distilled H$_2$O to Volume | |
| pH 7.0 to 7.2 | |

Stage 3

The contents of the Stage 2 seed flask (500 ml.) were used to inoculate 160 liters of Medium D in a 50 gallon stainless steel fermentor. Incubation in the fermentor was allowed to proceed for 48 hours at a temperature of 28°C., with agitation at 150 rpm. and airflow of 3 cu. ft. per minute. During incubation, defoamer (Polyglycol No. 2000) was used as required to control foam. During the fermentation, physiology determinations were made as follows:

| Age (Hours) | 0 | 12 | 24 | 36 | 48 |
|---|---|---|---|---|---|
| pH | 6.95 | 6.9 | 6.1 | 6.3 | 7.25 |
| sugar (dextrose) mg./ml. | 9.2 | 8.9 | 5.6 | 0.8 | 0.3 |

Stage 4

A portion of the contents of the Stage 3 fermentor (43 liters or 8.3% of the Stage 4 fermentor volume) was used to inoculate 467 liters of Medium D in a 200 gallon stainless steel fermentor. Fermentation was allowed to proceed for 96 to 120 hours at a temperature of 28°C. with agitation at 130 rpm. and an airflow of 10 cu. ft. per minute. During fermentation, defoamer (Polyglycol No. 2000) was used as required to control foam.

| Medium D | |
|---|---|
| Distiller's Solubles | 2% |
| Dextrose | 1% |
| Amber Yeast BYF 300 | 1% |
| Water to Volume | |
| pH to 7.0 before sterilization | |

Determinations were made periodically of pH, dextrose concentration and antibiotic activity as follows:

| Age in Hours | 0 | 12 | 24 | 36 | 48 | 60 | 72 | 84 | 96 | 108 | 120 |
|---|---|---|---|---|---|---|---|---|---|---|---|
| pH | 6.5 | 5.9 | 6.0 | 6.9 | 7.3 | 7.7 | 8.1 | 8.1 | 8.2 | 8.3 | 8.3 |
| Sugar (dextrose) mg./ml. | 9.5 | 6.0 | 0.7 | 0.6 | 0.4 | 0.3 | 0.2 | | | | |
| Assay: S. aureus (MB-108) | — | | | 21.5 | 24.5 | 24 | 24 | 24 | 22 | 22 | 18.5 |
| P. vulgaris (MB-838) | — | — | — | — | | | Halo | 18 | 18.5 | 18 | 18.5 |

What is claimed is:

1. A method of promoting the growth of animals which comprises the administration to said animals of a growth promoting amount of the antibiotic Ensanchomycin, said antibiotic being characterized by the following properties: an ultraviolet absorption peak at 247 m$\mu$ in an acid solution and an ultraviolet absorption peak at 258 m$\mu$ in a basic solution having an infrared spectrum in a Nujol mull as shown in FIG. 1, and an elemental analysis of its ammonium salt as follows: C = 47.11 percent; H = 6.90 percent; N = 7.67 percent; phosphorus = 1.93 percent; and O = 36.39 percent (by difference) with the said ammonium salt having an approximate empirical formula of: $C_{63}H_{110}N_9O_{36}P$ and a measured equivalent weight of 1477, and a pK$_a$ of 4.6, or its pharmaceutically acceptable salts.

2. A method of treating bacterial infections in animals which comprises the administration to said animal of an antibacterially effective amount of the antibiotic Ensanchomycin, said antibiotic being characterized by the following properties: an ultraviolet absorption peak at 247 m$\mu$ in an acid solution and an ultraviolet absorption peak at 258 m$\mu$ in a basic solution having an infrared spectrum in a Nujol mull as shown in FIG. 1, and an elemental analysis of its ammonium salt as follows: C = 47.11 percent; H = 6.90 percent; N = 7.67 percent; phosphorus = 1.93 percent; and O = 36.39 percent (by difference) with the said ammonium salt having an approximate empirical formula of: $C_{63}H_{110}N_9O_{36}P$ and a measured equivalent weight of 1477, and a pK$_a$ of 4.6, or its pharmaceutically acceptable salts.

3. An antibacterial composition comprising an antibacterially effective amount of the antibiotic Ensanchomycin, said antibiotic being characterized by the following properties: an ultraviolet absorption peak at 247 m$\mu$ in an acid solution and an ultraviolet absorption peak at 258 m$\mu$ in a basic solution having an infrared spectrum in a Nujol mull as shown in FIG. 1, and an elemental analysis of its ammonium salt as follows: C = 47.11 percent; H = 6.90 percent; N = 7.67 percent; phosphorus = 1.93 percent; and O = 36.39 percent (by difference) with the said ammonium salt having an approximate empirical formula of: $C_{63}H_{110}N_9O_{36}P$ and a measured equivalent weight of 1477, and a pK$_a$ of 4.6, or its pharmaceutically acceptable salts and a nontoxic pharmaceutically acceptable carrier.

4. A composition for use in the growth promotion of animals comprising a growth promoting amount of the antibiotic Ensanchomycin, said antibiotic being characterized by the following properties: an ultraviolet absorption peak at 247 m$\mu$ in an acid solution and an ultraviolet absorption peak at 258 m$\mu$ in a basic solution having an infrared spectrum in a Nujol mull as shown in FIG. 1, and an elemental analysis of its ammonium salt as follows: C = 47.11 percent; H = 6.90 percent; N = 7.67 percent; phosphorus = 1.93 percent; and O = 36.39 percent (by difference) with the said ammonium salt having an approximate empirical formula of: $C_{63}H_{110}N_9O_{36}P$ and a measured equivalent weight of 1477, and a pK$_a$ of 4.6, or its pharmaceutically acceptable salts and a food supplement.

* * * * *